United States Patent
Bhat et al.

(10) Patent No.: US 11,173,803 B2
(45) Date of Patent: Nov. 16, 2021

(54) RECONFIGURABLE MICRO-GRID

(71) Applicant: Ford Global Technologies, LLC, Dearborn, MI (US)

(72) Inventors: Krishna Prasad Bhat, Canton, MI (US); Jacek Brauner, Plymouth, MI (US); Xi Lu, Northville, MI (US); Theodore Joseph Filippi, Brownstown, MI (US); Ke Zou, Canton, MI (US); Allan Roy Gale, Livonia, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 16/166,330

(22) Filed: Oct. 22, 2018

(65) Prior Publication Data
US 2020/0122585 A1  Apr. 23, 2020

(51) Int. Cl.
| | | |
|---|---|---|
| *B60L 55/00* | (2019.01) | |
| *H01H 47/00* | (2006.01) | |
| *G05B 19/042* | (2006.01) | |
| *H02H 7/26* | (2006.01) | |
| *H01R 27/02* | (2006.01) | |
| *H02H 7/122* | (2006.01) | |

(52) U.S. Cl.
CPC .......... *B60L 55/00* (2019.02); *G05B 19/042* (2013.01); *H01H 47/001* (2013.01); *G05B 2219/25179* (2013.01); *H01R 27/02* (2013.01); *H02H 7/1227* (2013.01); *H02H 7/26* (2013.01)

(58) Field of Classification Search
CPC .... H01H 47/00; H01H 47/001; G05B 19/042; B60L 1/00; B60L 1/006; B60L 53/00; H02P 9/04; F01D 15/10; H02K 7/18; H02J 7/14
USPC ........ 307/9.1, 9.2, 10.1, 66, 64, 82, 80, 149; 322/28, 90, 89; 363/37, 39, 35; 290/52; 701/22
See application file for complete search history.

(56) References Cited

U.S. PATENT DOCUMENTS

| | | | |
|---|---|---|---|
| 5,086,266 A * | 2/1992 | Shiga | H02J 7/1438 322/28 |
| 8,682,495 B2 | 3/2014 | Carralero et al. | |
| 8,766,474 B2 | 7/2014 | Carralero et al. | |
| 2004/0245783 A1* | 12/2004 | Gilbreth | H02J 1/10 290/52 |
| 2010/0270860 A1* | 10/2010 | Kamaga | B60R 16/03 307/10.7 |
| 2011/0181104 A1* | 7/2011 | Kamaga | B60L 50/61 307/9.1 |

(Continued)

*Primary Examiner* — Rexford N Barnie
*Assistant Examiner* — Jagdeep S Dhillon
(74) *Attorney, Agent, or Firm* — David B. Kelley; Brooks Kushman P.C.

(57) ABSTRACT

A vehicle system includes a converter, outlets, and a switching arrangement electrically between the outlets and the converter. A controller is programmed to, responsive to a first request, operate the switching arrangement to electrically connect a line and a neutral to a first outlet and operate the converter to output single-phase power to the first outlet. Responsive to a second request, the controller is configured to operate the switching arrangement to electrically connect a plurality of lines and not the neutral to a second outlet, and operate the converter to output three-phase power to the second outlet.

12 Claims, 5 Drawing Sheets

(56) References Cited

U.S. PATENT DOCUMENTS

| | | | |
|---|---|---|---|
| 2014/0371968 A1* | 12/2014 | Sakamoto | B60L 55/00 701/22 |
| 2015/0326020 A1* | 11/2015 | Lichter | H02J 13/00004 307/39 |
| 2017/0160711 A1 | 6/2017 | Wong et al. | |

* cited by examiner

RECONFIGURABLE MICRO-GRID

TECHNICAL FIELD

The present disclosure relates to systems and methods for a reconfigurable micro-grid for an electric or hybrid-electric vehicle.

BACKGROUND

Electrified vehicles include electrical power sources such as a battery and a generator. The electrical power sources are used for propulsion and providing power to on-board systems. The power provided to the on-board systems is predefined and generally not extendible to off-board devices. Electrified vehicles may include limited power provision to external devices. For example, the vehicle may provide one or more 12-Volt outlets for providing power to external devices. However, these predefined power outlets provide little flexibility regarding devices that can receive power from the vehicle. Only devices that are compatible with the 12-Volt power output can be plugged in. Many power configurations for external devices are unsupported by typical vehicles.

SUMMARY

In at least one approach, a vehicle system is provided. The vehicle system may include a converter, outlets, and a switching arrangement electrically between the outlets and the converter. The vehicle system may further include a controller programmed to, responsive to a first request, operate the switching arrangement to electrically connect a line and a neutral to a first outlet and operate the converter to output single-phase power to the first outlet. The controller may further be programmed to, responsive to a second request, operate the switching arrangement to electrically connect a plurality of lines and not the neutral to a second outlet, and operate the converter to output three-phase power to the second outlet.

In at least one approach, a vehicle is provided. The vehicle may include first and second power outlets and multi-phase first and second converters, each in selective electrical communication with the first and second power outlets. The vehicle may further include a switching arrangement electrically between the outlets and the converters. The vehicle may further include a controller programmed to control the first and second converters to output one-phase power to the first outlet, and to output three-phase power to the second outlet.

In at least one approach, a method is provided. The method may include providing a power output having a voltage and a frequency from a converter to a first outlet. The method may further include, responsive to receiving power specifications defining a target voltage and a target frequency corresponding to a second outlet electrically disconnected from the converter, changing, by a controller, a target power output of the converter to the target voltage and target frequency.

In at least one approach, a vehicle system is provided. The vehicle system may include a multi-phase, multi-frequency converter and a controller. The controller may be configured to, responsive to a first power request corresponding to a first outlet having a first electrical parameter configuration, output power from the converter to the first outlet. The controller may further be configured to, responsive to a second power request corresponding to a second outlet having a second electrical parameter configuration different than the first electrical parameter configuration, output power from the converter to the second outlet.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Different electrical power applications may necessitate different electrical connector styles and/or different levels of voltage or current, including, but not limited to, single- or three-phase AC voltage, DC voltage, and so on. Vehicles including a traction battery may be configured to power one or more electrical loads external to the vehicle, e.g., external to an electrical system of the vehicle. Such vehicle micro-grid systems may be limited in their ability to output different levels of voltage and current multiple voltage and current, i.e., voltage and current output levels according to those necessary to operate different electrical loads connected thereto. In some instances, a different voltage convertor and a different electrical connector type may need to be connected to the vehicle micro-grid system for each power application. This may complicate overall system and may clutter the vehicle micro-grid output interface with multiple convertors and connectors. Additionally or alternatively, some power applications may be enhanced through application of a ground fault circuit interrupt (GFCI) and/or circuit breaker protection device. This may add further complexity to the vehicle micro-grid system and may increase cost of the system design.

In at least one approach, the microgrids and methods described herein may be suitable for use with a service vehicle that has one or more energy converters capable of outputting a multitude of electrical specifications (e.g., voltage, phase, frequency etc.). A user may therefore power a variety of loads such as simple hand tools (e.g., at 110V), large motors (e.g., at 480V three-phase), from a single energy converter.

Figure 1:
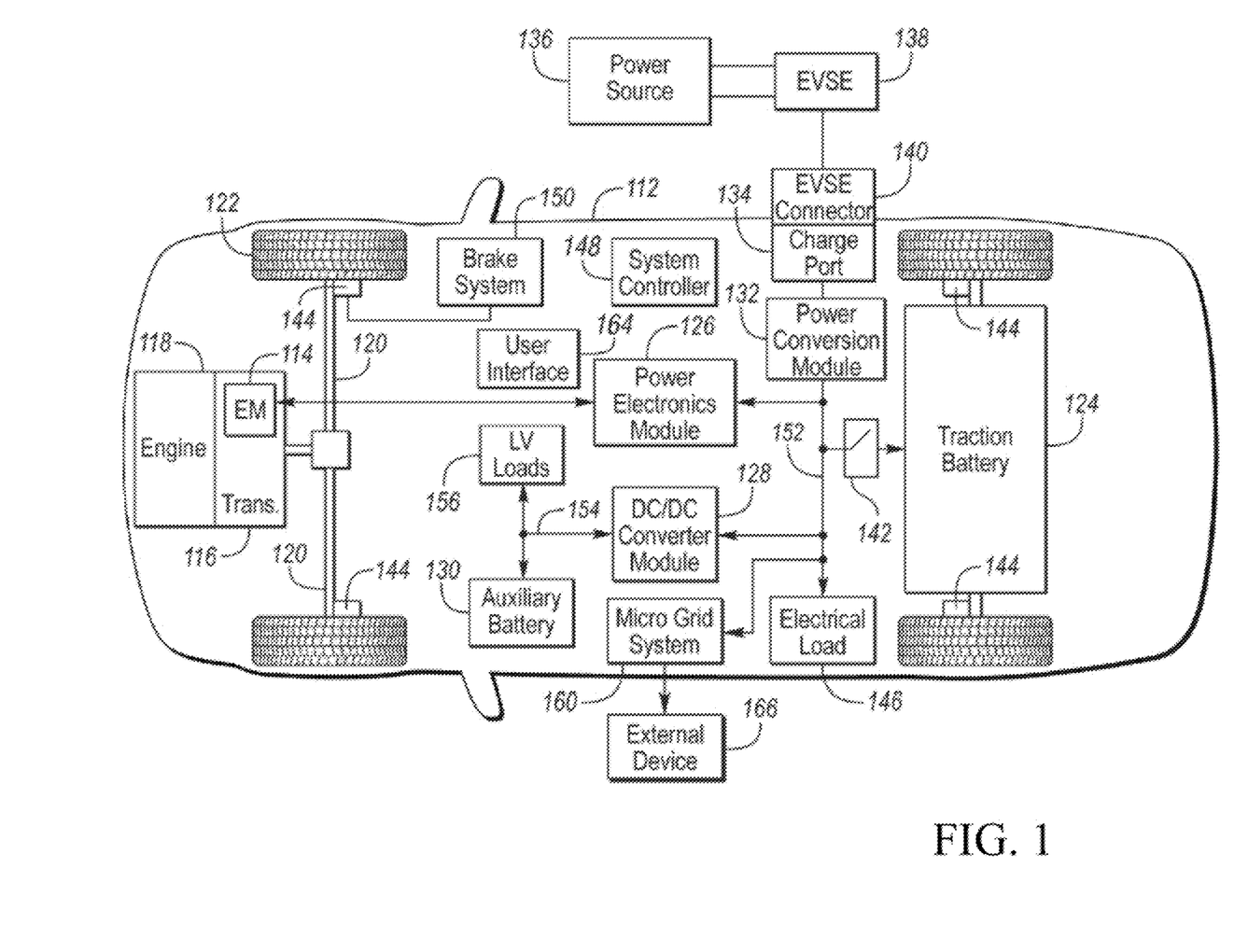
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs.

The vehicle 112 may be configured to provide electrical power for external devices. The vehicle 112 may further include a microgrid system 160. The microgrid system 160 may be a vehicle system that is configured to provide electrical power to one or more external devices 166. The microgrid system 160 may receive power from the high-voltage bus 152 and the traction battery 124. The microgrid system 160 may include power conversion circuitry to generate an output voltage and current for external devices that are connected to the microgrid system 160.

Figure 2:
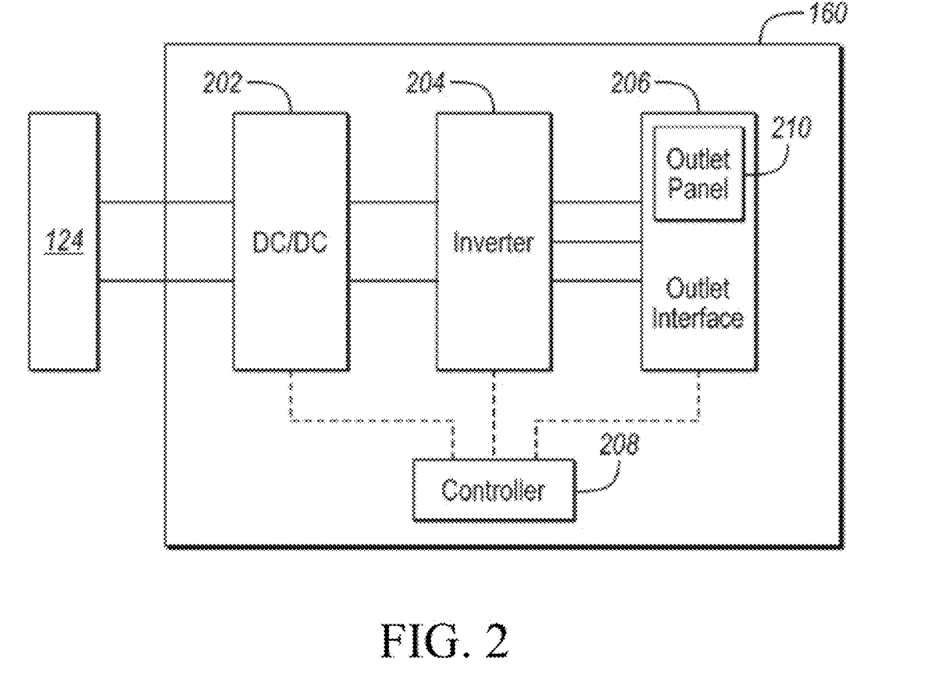
FIG. 2 depicts a possible configuration for a vehicle system including an outlet panel.

FIG. 2 depicts a possible diagram for the microgrid system 160. The microgrid system 160 may include a DC/DC power converter 202 that provides power to an inverter 204. In some configurations, the function of the DC/DC power converter 202 may be provided by the DC/DC converter module 128 that powers the low-voltage bus 154. The inverter 204 may be configured to convert a DC voltage input to an alternating current (AC) voltage output. The DC/DC power converter 202 may be configured to adjust the voltage level of the traction battery 124 to a voltage level used by the inverter 204. The inverter 204 may be configured to provide one or more voltage outputs. For example, the inverter 204 may be configured to provide three voltage outputs (e.g., three-phase inverter). In some configurations, the microgrid system 160 may be configured to utilize existing DC/DC converters and inverters that are in the vehicle (e.g., DC/DC converter module 128 and Power Electronics Module 126). The microgrid system 160 may include a controller 208. The controller 208 may be configured to operate the components of the microgrid system 160 including the DC/DC power converter 202 and the inverter 204. The controller 208 may be integrated with the inverter 204. In some configurations, the controller 208 may be implemented as multiple controllers distributed or integrated with the other components.

The DC/DC power converter 202 may include inputs that are electrically coupled to the high-voltage bus 152 and the traction battery 124. The DC/DC power converter 202 may be configured to convert the voltage level of the high-voltage bus 152 to a desired voltage input level for the inverter 204. The DC/DC power converter 202 may include a bypass mode in which the voltage of the high-voltage bus is transferred to the inputs of the inverter 204. The DC/DC power converter 202 may include switching devices and circuit elements that are arranged and controlled to output the desired voltage level. The switching devices may be controlled by a controller (e.g., controller 208) that sequences the switching according to the desired power output. The DC/DC power converter 202 may include boost modes of operation that output a voltage that is greater than the voltage of the high-voltage bus 152. The DC/DC power converter 202 may include buck modes of operation that output a voltage that is less than the voltage of the high-voltage bus 152.

The inverter 204 may be configured to provide one or more voltage/current outputs. The inverter 204 may be configured to convert a DC voltage input into one or more AC voltage outputs. The inverter 204 may be a three-phase inverter that is configured to provide three AC voltage/current waveforms. The inverter 204 may include power switching circuitry that includes a plurality of switching devices. The switching devices may be Insulated Gate Bipolar Junction Transistors (IGBTs) or other solid-state switching devices. The switching devices may be arranged to selectively couple a positive terminal and a negative terminal of the high-voltage bus 152 to each terminal or leg of the inverter power output. Each of the switching devices within the power switching circuitry may have an associated diode connected in parallel to provide a path for inductive current when the switching device is in a non-conducting state. Each of the switching devices may have a control terminal for controlling operation of the associated switching device. The control terminals may be electrically coupled to a controller. The controller may include associated circuitry to drive and monitor the control terminals. For example, the control terminals may be coupled to the gate input of the solid-state switching devices.

Each leg of the inverter 204 may include a first switching device that selectively couples the HV-bus positive terminal to the associated output terminal. A first diode may be coupled in parallel to the first switching device. A second switching device may selectively couple the HV-bus negative terminal to the associated output terminal. A second diode may be coupled in parallel to the second switching device. Each inverter output leg may be similarly configured. To provide a DC voltage output, the first switching device may be activated continuously.

The controller (e.g., 208) may be programmed to operate the switching devices to control the voltage and current at the inverter outputs. The controller 208 may operate the switching devices so that each inverter output is coupled to only one of the HV-bus positive terminal or the HV-bus negative terminal at a particular time. Various power output algorithms and strategies are available to be implemented in the controller 208. The controller 208 may receive power specification data that identifies the desired voltage and current output waveform. For example, the inverter outputs may be characterized by voltage magnitude, current magnitude, and frequency. The controller 208 may be programmed to operate the inverter 204 to achieve the desired voltage and current output waveform. The controller 208 may implement open-loop and/or closed loop strategies to achieve the result. The controller 208 may operate the switching devices with a pulse-width modulated (PWM) gate signal.

The inverter 204 may include current sensors for each inverter power output. The current sensors may be inductive or Hall-effect devices configured to generate a signal indicative of the current passing through the associated circuit. The controller 208 may sample the current sensors at a predetermined sampling rate.

The inverter 204 may include one or more voltage sensors. The voltage sensors may be configured to measure an input voltage to the inverter 204 and/or one or more of the output voltages of the inverter 204. The voltage sensors may be resistive networks and include isolation elements to separate high-voltage levels from the low-voltage system. In addition, the inverter 204 may include associated circuitry for scaling and filtering the signals from the current sensors and the voltage sensors.

In some configurations, the DC/DC power converter 202 and inverter 204 may be integrated as a single unit. The overall function may remain as described. The end result is that the microgrid system 160 is configured to provide one or more power outputs. The microgrid system 160 may provide power outputs of varying power specifications. The power specifications may include voltage magnitude, current magnitude, and frequency. The controller 208 may be configured to operate the DC/DC power converter 202 and/or the inverter 204 to achieve power outputs with the requested power specifications. The microgrid system 160 may support a variety of different power specifications for different outlet panels 210. The microgrid system 160 may be configured to provide power having a range of desired frequencies and desired AC/DC voltage magnitudes. In addition, the microgrid system 160 may be configured to support simultaneous output of power signals having different power specifications (e.g., support multiple voltages with different magnitudes).

The microgrid system 160 may include an outlet interface 206. The outlet interface 206 may provide a mechanical and electrical interface to an outlet panel 210. The outlet interface 206 may include a housing that is configured to receive the outlet panel 210. The housing may be configured to interchangeably couple the outlet panel 210 to the inverter 204. The housing may include mechanical connection points for securing the outlet panel 210 to the housing. The outlet panel 210 may be secured by one or more fasteners and/or latching mechanisms. In some configurations, the housing may define an opening for inserting the outlet panel 210. A shape of the opening and the outlet panel 210 may be such that outlet panel 210 only fits into the opening in one orientation. Such configuration may prevent improper installation of the outlet panel 210 into the outlet interface 206. In other configurations, the opening and the outlet panel 210 may be keyed or slotted complementarily such that only proper installation is possible.

The outlet interface 206 may be further configured to receive the power outputs from the inverter 204. The outlet interface 206 may be further configured to transfer the power outputs from the inverter 204 to the outlet panel 210. For example, the outlet interface 206 may include a circuit board within the housing having conductive traces for routing signals and power. The outlet interface 206 may include a connector or receptacle for receiving a mating connector of the outlet panel 210. The conductors of the connectors may be electrically coupled to the traces to facilitate the transfer of power and data signals to and from the outlet panel 210. The connector or receptacle may define the interface between the vehicle electrical system and the outlet panel 210.

Industrial and household systems generally use commonly available power connections. For example, household applications typically utilize 120 VAC electrical power. Other household applications may use 240 VAC electrical power. Industrial applications may utilize 240V three-phase AC electrical power. The outlet panel 210 may be designed to support a variety of power connections. Standards may be defined to identify particular plugs and connectors for each type of electrical power connection. The outlet panel 210 may be configured with a variety of outlets that provide power with different characterizing parameters.

The outlet panel 210 may be designed as an interchangeable component. That is, outlet panels having different power connections may be swapped in and out of the outlet interface 206. To facilitate panel interchangeability, there may be some form of communication between the outlet panel 210 and the controller 208. Each outlet panel 210 may provide power outlets having a predetermined power specification. The outlet panels 210 may be configured to transfer information that is indicative of the power specification to the controller 208. The controller 208 may then operate the vehicle components to achieve the power specifications.

The controller 208 may implement general control strategies that support power specifications within a particular range of values. The controller 208 may operate the DC/DC converter 202 and the inverter 204 to achieve the power specifications. In some configurations, the controller 208 may be programmed to implement a predetermined set of power specifications. For example, the controller 208 may be programmed to implement typical household voltages and currents (e.g., 120 VAC, 240 VAC, 60 Hz).

The microgrid system may be configured so that outlet panels may be swapped or changed when a different power configuration is desired. Outlet panels with different combinations of power outlets may be defined. This feature provides flexibility in the microgrid system as many outlet panels may be designed with different power specifications. Many additional combinations of power outlets may be defined. The outlet panels may be configured to be removable from the outlet interface 206. In some configurations, the outlet panels may be secured to the outlet interface 206 via a fastener (e.g., thumb screw). The operator may swap outlet panels to match the equipment that is to be powered from the microgrid system.

As discussed, a variety of outlet panels may be installed in the outlet interface 206. To ensure that the inverter 204 outputs the correct voltage levels, the system may benefit from knowing which type of outlet panels are connected. In a configuration in which the inverter provides a fixed output voltage, the outlet panels may be keyed such that only outlet panels that are compatible may be installed. Each outlet panel may be configured to provide a connection to the electrical connection interface. Each outlet panel may be configured to utilize the power and data signals from the electrical connection interface as needed. However, the outlet panel may be configured to ensure that any limits defined by the electrical connection interface are not exceeded. For example, the outlet panel should be designed to not exceed power and current limits for each signal in the electrical connection interface.

An outlet panel may include an outlet panel controller. Circuit breakers may be electrically resettable by the outlet panel controller via a control signal that is electrically connected to the outlet panel controller. The outlet panel controller may include interface circuitry for activating and deactivating the control signal. The outlet panel controller may be electrically connected to the controller 208 via the signal and data connections of the electrical interface. The outlet panel controller may be programmed to transfer and receive data via the electrical interface. For example, the outlet panel controller may implement a serial data interface for communicating with the controller 208. A communication protocol may be established for transferring data between the outlet panel controller and the controller 208.

The data transferred from the outlet panel controller may include power outlet data that includes power specifications for the outlet panel. The power specifications may include target voltage magnitudes and frequencies. The power specifications may include a current limit. The current limit may be a value that corresponds to a rated current of the circuit breakers. In addition, the power specifications may include a power type. For example, the power type may be DC or AC. The outlet panel controller may transfer the power outlet data to the controller 208 when the outlet panel is installed in the outlet interface 206. The specifications may further include information for each of the power connections (e.g., L1, L2, L3). Each power connection may be associated with a voltage, frequency and phase information. For example, in some configurations, a phase difference may be defined between two of the power connections. The power outlet data may define the power connections and the desired phase difference. The power outlet data may further include an indication of which power connections are used and which are not used for the outlet panel.

Additional data may be transferred via the communication interface. The outlet panel controller may be programmed to receive a circuit breaker reset signal from the controller 208. The reset signal may trigger the outlet panel controller to drive the control signal to the circuit breakers to close the breakers and connect the power signals to the outlet ports. The outlet panel controller may also transfer a status of the circuit breaker (e.g., open or closed) to the controller 208.

The outlet panel or the inverter 204 may include a ground fault interrupter circuit. The ground fault interrupter circuit may be configured to compare the current flowing to the power pins and from the neutral pin and open the circuit if the currents differ by more than a predetermined amount. The ground fault interrupter circuit may work in conjunction with the circuit breakers. In some configurations, the circuit breaker and ground fault interrupter circuit may be combined. The ground fault interrupter circuit may also be implemented in the inverter 204. After opening the circuit, the ground fault interrupter circuit may be reset via a control signal.

The outlet panel controller may be configured to drive the control signal for the ground fault interrupter circuit. The outlet panel controller may transfer a status of the ground fault interrupter circuit (e.g., triggered, not triggered) to the controller 208. In configurations in which the ground fault interrupter circuit is implemented in the inverter 204, the controller 208 may transfer the status to the outlet panel controller.

The outlet panels may be configured to support a variety of power connections and ports. An advantage of the system is that outlet panels may be designed to support common electrical connections in a variety of countries. The outlet panels communicate the desired power requirements to the vehicle which can operate the inverter in the proper way. Since the outlet panels may be interchangeable, the microgrid system may be configured to provide a variety of power signals to the outlet panels. In this manner, the outlet panels are plug-and-play with the vehicle.

Operation of the microgrid system 160 may be maintained during ignition-off periods. During this time, power may be provided by the traction battery 124. In addition, operation of the microgrid system 160 may be maintained during ignition-on periods. During ignition-on periods, power may be provided by the traction battery 124. In electrified vehicles that include an engine, power may be further provide by the electric machines 114 which may be operated as generators powered by the engine 118. This allows the microgrid system 160 to operate for potentially long periods of time. The microgrid system 160 may find use in vehicles for construction operations that may need a variety of power outlets at remote sites where power may not be available.

The controller 208 may be programmed to operate the inverter 204 according to the power specifications received from the outlet panel controller. The controller 208 may command operation of the DC/DC converter 202 and the inverter 204 to achieve the power outputs with the specified power configuration. For example, the controller 208 may operate the inverter 204 to output an AC voltage with a magnitude and frequency that matches the power specification provided by the outlet panel. In addition, the controller 208 may operate the inverter 204 such that the power outputs of the inverter 204 have a desired phase difference as defined by the power outlet data. The controller 208 may command the DC/DC converter 202 to provide a DC voltage to the inverter 204 that allows the inverter 204 to provide the voltage magnitude as specified in the power specification provided by the outlet panel. The controller 208 may operate the inverter 204 using voltage and current feedback to ensure that the power specification is being satisfied.

In some configurations, the outlet panel controller may be a circuit that provides signals to the controller 208. The power outlet data may be encoded with discrete signals that are decoded by the controller 208. For example, the power outlet data may be encoded in four data pins in which fifteen different configurations may be identified. Note that additional data pins may be included to expand the configurations. Further, the data interface may include discrete signals for status and reset of the circuit breakers and the ground fault interrupter circuit.

The controller 208 may be programmed to manage the system when outlet panels are swapped and/or replaced with a different type of outlet panel. The controller 208 may be programmed to, responsive to replacing a first outlet panel with a second outlet panel having different power specifications, change the power specifications of power being output by the inverter 204 to the power specifications received from the second outlet panel. The controller 208 may further detect the removal of the first outlet panel and operate the inverter 204 to provide no power after removal of the first outlet panel, prior to insertion of the second outlet panel.

Some of the outlet panels may be configured to receive multiple power inputs and the corresponding power specifications may define target voltages and target frequencies for multiple power inputs. The controller 208 may be programmed to operate the inverter 204 such that separate output of the inverter 204 are used to supply the multiple power inputs with the corresponding target values and target frequencies. The target voltage and/or target frequencies may be different for each of the multiple power inputs.

Figure 3:
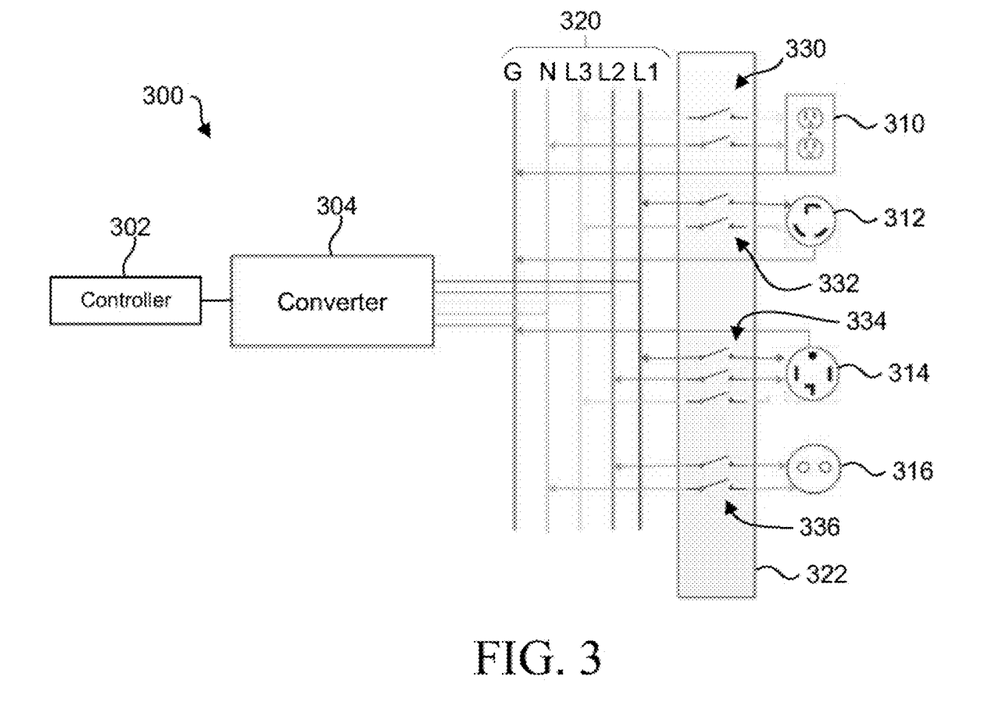
FIG. 3 is a first diagram depicting electrical connections between components of the vehicle system.

FIG. 3 depicts a possible electrical connection diagram for a microgrid system 300. A controller 302 may be adapted to control electrical communication between a converter 304 and one or more outlet ports. Each outlet port may be designed to provide a specific power interface for powering external equipment. The power specifications may vary across the multiple outlet ports. As such, each outlet port may be designed to supply a particular voltage and current to the external equipment. The outlet ports may include, for example, one or more of a first outlet 310, which may be a 120-volt 60-hertz single-phase outlet, a second outlet 312, which may be a 250-volt 60-hertz single-phase outlet, a third outlet 314, which may be a 208-volt 60-hertz three-phase outlet, and a fourth outlet 316, which may be a 220-volt 50-hertz single-phase outlet. In at least one approach, the outlets may be interchangeable outlets.

The converter 304 may be a multi-phase, multi-frequency converter. The converter 304 may be electrically coupled to a plurality of power connections 320. In this example, L1, L2, and L3 may represent power signals, N may represent a neutral connection, and G may represent a ground connection.

A switch matrix 322 may include a plurality of contactor groups that may selectively couple one or more outlets with selected power connections 320. Each contactor group may include one or more individual contactors. The individual contactors of a contactor group may be operated individually, or may be operated as a group. For example, a first contactor group 330 may selectively couple the ground connection, the neutral connection, and the L3 connection to the first outlet 310. A second contactor group 332 may selectively couple the ground connection, the L1 connection, and the L3 connection to the second outlet 312. A third contactor group 334 may selectively couple the ground connection, the L1 connection, the L2 connection, and the L3 connection to the third outlet 314. A fourth contactor group 336 may selectively couple the neutral connection and the L2 connection to the fourth outlet 316. In this way, the number of contactor groups may correspond to the number of electrical outlets.

|                  | Contactor Group |     |     |     |
| ---------------- | --- | --- | --- | --- |
| Converter Output | 336 | 332 | 334 | 336 |
| 120 V            | \|  | \|  | O   | O   |
| 240 V            | \|  | \|  | O   | O   |
| 208 V 1Ø         | \|  | \|  | \|  | O   |
| 208 V 3Ø         | \|  | O   | \|  | O   |
| 220 V 50 Hz      | O   | O   | O   | \|  |

Figure 4:
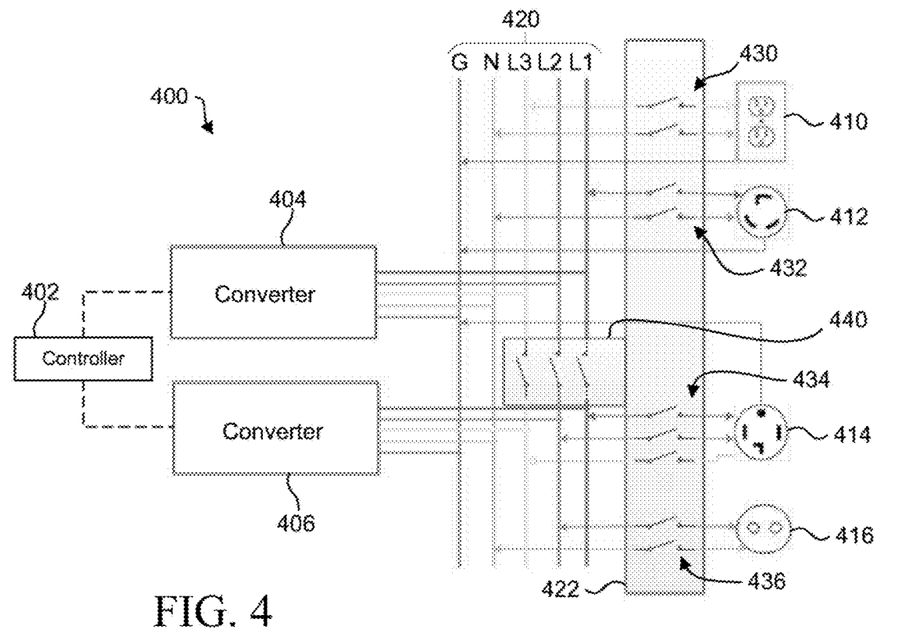
FIG. 4 is a second diagram depicting electrical connections between components of the vehicle system.

FIG. 4 depicts another possible electrical connection diagram for a microgrid system 400. A controller 402 may be adapted to control electrical communication between multiple converters, such as converter 404 and converter 406, and one or more outlet ports. Each outlet port may be designed to provide a specific power interface for powering external equipment. The power specifications may vary across the multiple outlet ports. As such, each outlet port may be designed to supply a particular voltage and current to the external equipment. The outlet ports may include, for example, one or more of a first outlet 410, which may be a 120-volt 60-hertz single-phase outlet, a second outlet 412, which may be a 250-volt 60-hertz single-phase outlet, a third outlet 414, which may be a 208-volt 60-hertz three-phase outlet, and a fourth outlet 416, which may be a 220-volt 50-hertz single-phase outlet. In at least one approach, the outlets may be interchangeable outlets.

One or both of the converters 404, 406 may be a multi-phase, multi-frequency converter. The converters 404, 406 may be electrically coupled to a plurality of power connections 420. In this example, L1, L2, and L3 may represent power signals, N may represent a neutral connection, and G may represent a ground connection.

A switch matrix 422 may include a plurality of contactor groups that may selectively couple one or more outlets with selected power connections 420. Each contactor group may include one or more individual contactors. The individual contactors of a contactor group may be operated individually, or may be operated as a group. For example, a first contactor group 430 may selectively couple the ground connection, the neutral connection, and the L3 connection to the first outlet 410. A second contactor group 432 may selectively couple the ground connection, the neutral connection, and the L1 connection to the second outlet 412. A third contactor group 434 may selectively couple the ground connection, the L1 connection, the L2 connection, and the L3 connection to the third outlet 414. A fourth contactor group 436 may selectively couple the neutral connection and the L2 connection to the fourth outlet 416. In this way, the number of contactor groups may correspond to the number of electrical outlets.

In at least one approach, the switch matrix 422 may further include a contactor group 440. The contactor group 440 may selectively couple the L1 connection, the L2 connection, and the L3 connection between multiple converters (e.g., converter 404 and converter 406). In this way, the contactor group 440 may be adapted to isolate a converter (e.g., converter 404 or converter 406). The contactor group 440 may also be adapted to combine multiple converters (e.g., converter 404 and converter 406). The contactor group 440 may also be adapted to parallel multiple converters (e.g., converter 404 and converter 406). Furthermore, the contactor group 440 may permit contactor groups 430 and 432 to operate independently from contactor groups 434 and 436.

| Converter 404 Output | Converter 406 Output | Contactor Group 440 |
| --- | --- | --- |
| 120 V | 120 V | ON/OFF |
| 120 V | OFF   | OFF    |
| OFF   | 120 V | OFF    |
| 120 V | 208 V | OFF    |

Figure 5:
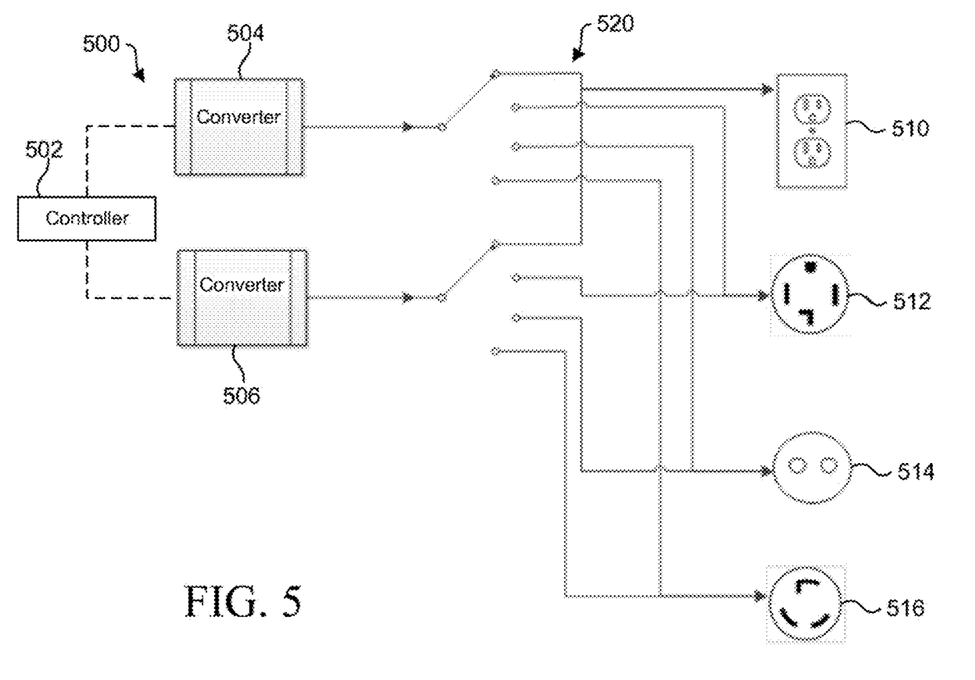
FIG. 5 is a third diagram depicting electrical connections between components of the vehicle system.

FIG. 5 depicts another possible electrical connection diagram for a microgrid system 500. A controller 502 may be adapted to control electrical communication between multiple converters, such as converter 504 and converter 506, and one or more outlet ports. Each outlet port may be designed to provide a specific power interface for powering external equipment. The power specifications may vary across the multiple outlet ports. As such, each outlet port may be designed to supply a particular voltage and current to the external equipment. The outlet ports may include, for example, one or more of a first outlet 510, which may be a 120-volt 60-hertz single-phase outlet, a second outlet 512, which may be a 208-volt 60-hertz three-phase outlet, a third outlet 514, which may be a 220-volt 50-hertz single-phase outlet, and a fourth outlet 416, which may be a 250-volt 60-hertz single-phase outlet. In at least one approach, the outlets may be interchangeable outlets.

One or both of the converters 504, 506 may be a multi-phase, multi-frequency converter. The converters 504, 506 may be electrically coupled to a plurality of power connections 520. As shown, this approach may provide a single-throw, multiple-pole contactor configuration. The number of poles may be equal to, or may be greater, than the number of outlet lines that interface the individual outlet ports. As shown, each outlet port 510, 512, 514, and 516 is provided with a single outlet line interfacing the outlet port, such that four outline lines are provided for the single throw. In this approach, multiple energy sources (e.g., converter 504 and converter 506) may be paralleled; for example, to provide additional power to one or more of the outlets.

Figure 6:
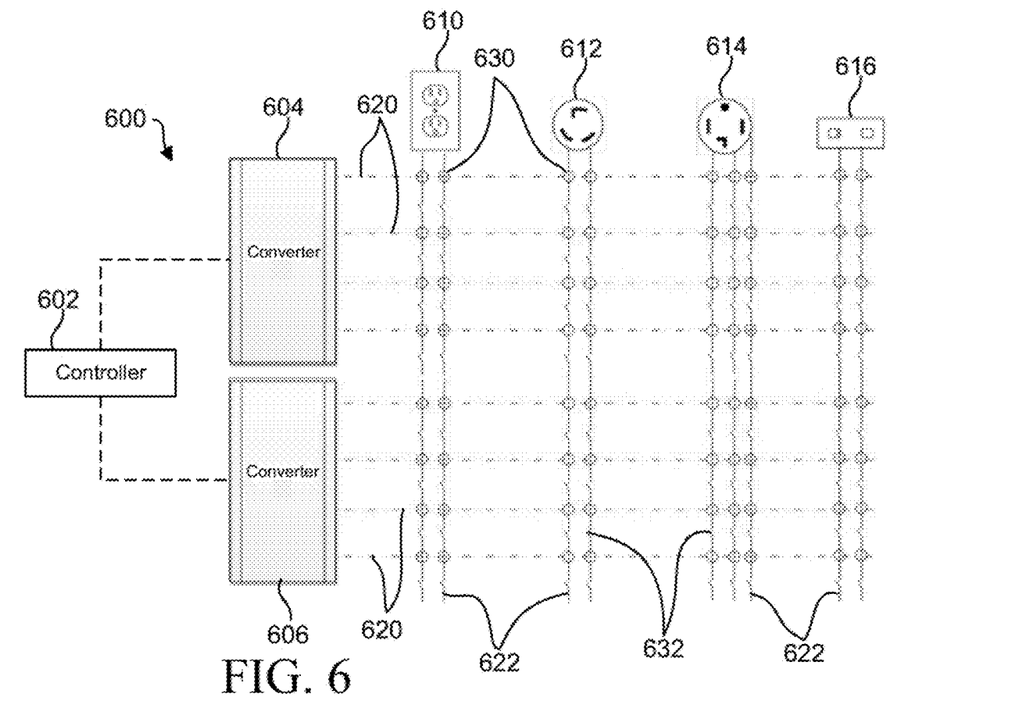
FIG. 6 is a fourth diagram depicting electrical connections between components of the vehicle system.

FIG. 6 depicts another possible electrical connection diagram for a microgrid system 600. A controller 602 may be adapted to control electrical communication between multiple converters, such as converter 604 and converter 606, and one or more outlet ports. Each outlet port may be designed to provide a specific power interface for powering external equipment. The power specifications may vary across the multiple outlet ports. As such, each outlet port may be designed to supply a particular voltage and current to the external equipment. The outlet ports may include, for example, one or more of a first outlet 610, which may be a 120-volt 60-hertz single-phase outlet, a second outlet 612, which may be a 250-volt 60-hertz single-phase outlet, a third outlet 614, which may be a 208-volt 60-hertz three-phase outlet, and a fourth outlet 616, which may be a 48-volt DC outlet. In at least one approach, the outlets may be interchangeable outlets.

In this approach, a matrix of converter output lines 620 (depicted as dashed horizontal lines) and outlet lines 622 (depicted as vertical lines) may be interlaced with contactors or switches. For example, switches 630 (depicted as circles) may connect converter output lines 620 to outlet lines 622. Contactors 632 may connect adjacent output lines 620. In this approach, multiple converters (e.g., converter 604 and converter 606) may be connected in series; for example, to achieve a desired voltage rating.

Figure 7:
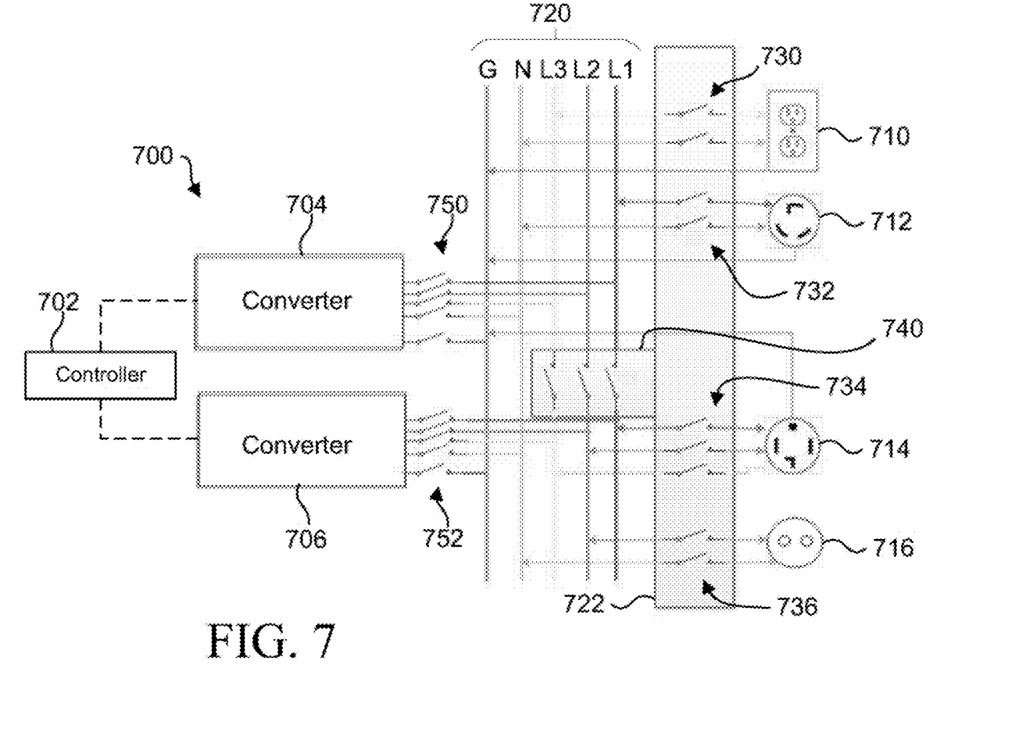
FIG. 7 is a fifth diagram depicting electrical connections between components of the vehicle system.

FIG. 7 depicts another possible electrical connection diagram for a microgrid system 700. A controller 702 may be adapted to control electrical communication between multiple converters, such as converter 704 and converter 706, and one or more outlet ports. Each outlet port may be designed to provide a specific power interface for powering external equipment. The power specifications may vary across the multiple outlet ports. As such, each outlet port may be designed to supply a particular voltage and current to the external equipment. The outlet ports may include, for example, one or more of a first outlet 710, which may be a 120-volt 60-hertz single-phase outlet, a second outlet 712, which may be a 250-volt 60-hertz single-phase outlet, a third outlet 714, which may be a 208-volt 60-hertz three-phase outlet, and a fourth outlet 716, which may be a 220-volt 50-hertz single-phase outlet. In at least one approach, the outlets may be interchangeable outlets.

One or both of the converters 704, 706 may be a multi-phase, multi-frequency converter. The converters 704, 706 may be electrically coupled to a plurality of power connections 720. In this example, L1, L2, and L3 may represent power signals, N may represent a neutral connection, and G may represent a ground connection.

A switch matrix 722 may include a plurality of contactor groups that may selectively couple one or more outlets with selected power connections 720. Each contactor group may include one or more individual contactors. The individual contactors of a contactor group may be operated individually, or may be operated as a group. For example, a first contactor group 730 may selectively couple the ground connection, the neutral connection, and the L3 connection to the first outlet 710. A second contactor group 732 may selectively couple the ground connection, the neutral connection, and the L1 connection to the second outlet 712. A third contactor group 734 may selectively couple the ground connection, the L1 connection, the L2 connection, and the L3 connection to the third outlet 714. A fourth contactor group 736 may selectively couple the neutral connection and the L2 connection to the fourth outlet 716. In this way, the number of contactor groups may correspond to the number of electrical outlets.

In at least one approach, the switch matrix 722 may further include a contactor group 740. The contactor group 740 may selectively couple the L1 connection, the L2 connection, and the L3 connection between multiple converters (e.g., converter 704 and converter 706). In this way, the contactor group 740 may be adapted to isolate a converter (e.g., converter 704 or converter 706). The contactor group 740 may also be adapted to combine multiple converters (e.g., converter 704 and converter 706). The contactor group 740 may also be adapted to parallel multiple converters (e.g., converter 704 and converter 706). Furthermore, the contactor group 740 may permit contactor groups 730 and 732 to operate independently from contactor groups 734 and 736.

In at least one approach, the microgrid system 700 a fifth contactor group 750 that may selectively connect the converter 704 to, and selectively disconnect the converter 704 from, one or more lines of the power connections 720. Similarly, or instead, the microgrid system 700 a sixth contactor group 752 that may selectively connect the converter 706 to, and selectively disconnect the converter 706 from, one or more lines of the power connections 720. In this way, the grounding of one or both of the converters 704, 706 may be disconnected. This may be desirable, for example, to minimize a voltage isolation requirement during a series connection of the energy sources.

Figure 8:
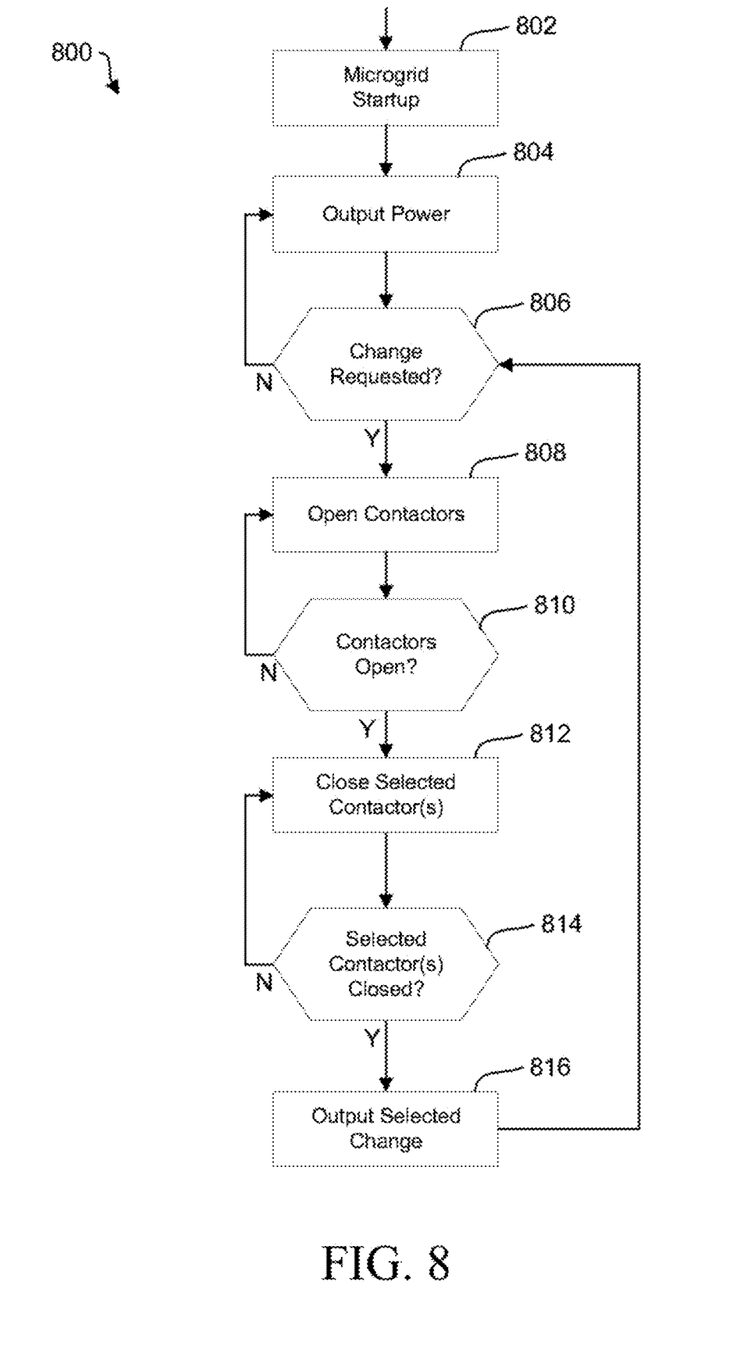
FIG. 8 is a flowchart of a possible sequence of operations for providing power to a plurality of power outlets.

FIG. 8 is a flowchart 800 for a possible sequence of operations for managing the microgrid system. At operation 802, instructions for starting up the microgrid may be performed. The microgrid startup may include initialization of the components upon power up or insertion of the outlet panel into the outlet interface. Microgrid startup may include establishing communication between the installed outlet panel and the controller (e.g., controller 208 or other controller discussed herein). At operation 804, power may be output by one or more converter to one or more outlets, as discussed elsewhere herein. The power may be output according to one or more specifications; for example, one or more of a commanded voltage, phase, or frequency. The determination of the appropriate power specification(s) may be performed, for example, at the controller and in response to a power request.

At operation 806, a power change request may be received. The power change request may include a power request that has one or more specifications different than the power provided at operation 804.

In response to receiving the power change request, the method 800 may include opening one or more contactors. This may be performed at the instruction of the controller. In at least one approach, all contactors are opened. In another approach, less than all of the contactors are opened.

At operation 810, a determination is made as to whether the contactors have been opened. This determination may be performed, for example, by the controller. If the contactors have been opened, the method 800 proceeds to operation 812, where the selected contactor(s) is closed. As used herein, the selected contactor is the appropriate contactor (or contactors) necessary to communicate power having the desired specifications (e.g., voltage, phase, frequency, etc.) to the outlet to be powered. Closure of the selected contactor(s) is verified at operation 814.

Upon verification of the selected contactor(s) being closed, power having the required specifications is output, for example, to an outlet, at operation 816. The method 800 may continue to monitor for a power change request at operation 806.

In at least one approach, a first power output to a first outlet may be stopped prior to, concurrent with, or after a second power output to a second outlet. In still another approach, the first power output to the first outlet may be continuous with the second power output to the second outlet.

In at least one approach, a vehicle may include an inverter and a housing configured to interchangeably couple outlet panels, each defining power specifications including target voltages and target frequencies, to the inverter. The vehicle further includes a controller programmed to, responsive to replacing a first outlet panel with a second outlet panel, change voltage and frequency outputs of the inverter to the target voltages and target frequencies received from the second outlet panel.

The controller may be further programmed to output a reset signal to the outlet panels for resetting a circuit breaker in outlet panels configured with the circuit breaker. The controller may be further programmed to receive a status of a ground fault interrupter circuit from the outlet panels. The outlet panels may receive multiple power inputs and the power specification may define corresponding target voltages and target frequencies for each of the multiple power inputs, and the controller may be further programmed to operate the inverter such that separate outputs of the inverter are used to supply the multiple power inputs with the corresponding target voltages and target frequencies. At least two of the target voltages may be of different magnitudes. The power specification may define a target direct current (DC) voltage magnitude and the controller may be programmed to operate the inverter to supply power with the target DC voltage magnitude. The power specifications may further define a current limit value and the controller may be further programmed to operate the inverter such that a current provided by the inverter does not exceed the current limit value. The controller may be further programmed to, responsive to the power specifications defining parameters that cannot be satisfied by the inverter, output a status to the outlet panels for display. The controller may be further programmed to, responsive to the power specifications defining parameters that cannot be satisfied by the inverter, operate the inverter to provide no power to the outlet panels.

A vehicle system may include a controller programmed to receive power specifications from interchangeable outlet panels via a communication channel and, responsive to replacing a first outlet panel with a second outlet panel, operate an inverter to change output power specifications of power provided by the inverter to the power specifications received from the second outlet panel.

The power specifications may include a target voltage and a target frequency, and the controller may be programmed to operate the inverter to supply power to the interchangeable outlet panels at the target voltage and target frequency. The power specifications may include a request for multiple voltage inputs to be supplied by the inverter, and the controller may be further programmed to operate the inverter such that separate phases of the inverter are used to supply each of the multiple voltage inputs. The multiple voltage inputs may be of different magnitudes. The power specifications may include a target DC magnitude and the controller may be programmed to operate the inverter to supply power with the target DC magnitude. The power specifications may include a current limit and the controller may be further programmed to operate the inverter such that a current provided by the inverter does not exceed the current limit. The controller may be further programmed to, responsive to the power specifications defining parameters that cannot be satisfied by the inverter, output a status via the communication channel for display on the interchangeable outlet panels.

In at least one approach, a method may include, by a controller, receiving power specifications defining target voltages and corresponding target frequencies from outlet panels interchangeably coupled to a housing in communication with an inverter. The method further includes, responsive to a first outlet panel being replaced by a second outlet panel having different power specifications, changing, by the controller, a power output of the inverter to the target voltages and corresponding target frequencies received from the second outlet panel.

The method may further include, responsive to the power specifications defining parameters that cannot be satisfied by the inverter, outputting, by the controller, a status signal indicative of the inverter being unable to satisfy the power specifications. The method may further include, responsive to the power specifications defining parameters that can be satisfied by the inverter, outputting, by the controller, a signal to reset at least one circuit breaker in the outlet panels. The method may further include, responsive to receiving a status indicator indicative of a ground fault from the outlet panels, operating, by the controller, the inverter to cease outputting power to the outlet panels.

In one possible sequence of operations for managing the microgrid system, instructions for starting up the microgrid may be performed. The microgrid startup may include initialization of the components upon power up or insertion of the outlet panel into the outlet interface. Microgrid startup may include establishing communication between the installed outlet panel and the controller 208. The outlet panel may transfer power outlet data to the controller 208. The power outlet data may indicate the power configuration that is to be provided to the outlet panel.

The controller 208 may receive and process the power outlet data. The power outlet data may include power specifications including target voltage and target frequencies. The controller 208 may check to determine if the power outlet data is compatible with the microgrid system. For example, the controller 208 may determine if the inverter 204 is capable of providing power with the requested power specifications. The controller 208 may also determine if the DC/DC converter 202 is capable of providing an appropriate input level to the inverter 204. If the request is not compatible with the inverter capability, the controller 208 may output a status indicating the incompatibility. For example, the status may be sent to the outlet panel for display (e.g., lamp or display). The status may also be sent to the user interface of the vehicle for display within the vehicle.

If the request is compatible with the inverter capability, the controller 208 may configure the power output to the outlet panel to satisfy the power specification. The controller 208 may configure operating parameters of the inverter 204 and DC/DC converter 202 to provide the specified power outputs.

The outlet panel may update the panel status. For example, the outlet panel controller may receive the status from the controller 208 and may output the status. For example, if the microgrid system is operational, the outlet panel may illuminate a lamp or present status information on a display. In addition, the outlet panel may reset circuit breakers if present. A check may be made to determine if the microgrid is to be shutdown. For example, the system may detect if the outlet panel is removed from the vehicle. In other examples, the outlet panel may include a switch (e.g., on/off switch) for enabling and disabling operation. If the microgrid system is to be shutdown, the inverter 204 may be commanded to cease outputting power. If a microgrid shutdown is not detected, the sequence may be repeated. The controller 208 may operate the inverter 204 and/or DC/DC converter 202 to achieve a power outputs that satisfies the requested power specification.

In at least one approach, a vehicle may include a pair of power converters. The vehicle may include a socket having an array of power terminals arranged to accept outlets of different power terminal configurations to interconnect the pair therewith. The vehicle may include a panel having an outlet engaged with the socket. The panel may include a controller configured to communicate an electrical rating of the outlet via the socket to define a switching scheme for the pair. The communication may be responsive to detecting panel and socket engagement.

In still another approach, a vehicle may include a socket having an array of power terminals arranged to accept outlets of different power terminal configurations to interconnect power converters therewith. The vehicle may include a panel having an outlet engaged with the socket. The vehicle may include a controller configured to operate the power converters commensurate with a load of the outlet such that the load is satisfied with one of the power converters providing more power than the other of the power converters. The operation may be responsive to detecting engagement of the panel and power converters.

In still another approach, a vehicle may include at least one power converter. The vehicle may include a socket having an array of power terminals arranged to accept outlets of different power terminal configurations to interconnect the at least one power converter therewith. The vehicle may include a panel having an outlet engaged with the socket. The vehicle may include a controller configured to communicate an electrical rating of the outlet such that the at least one power converter satisfies a load connected to the outlet. The communication may be responsive to detecting engagement of the panel and socket.

In at least one approach, a system for a vehicle may include a converter configured to, responsive to a first signal from a first adaptor indicating a first plug type having a first electrical parameter configuration, output power to the adaptor according to the first electrical parameter configuration, and responsive to a second signal from a second adaptor indicating a second plug type having a second electrical parameter configuration, output power to the adaptor according to the second configuration.

In still another approach, a system for a vehicle may include a converter configured to, responsive to different signals from different types of adaptors installed at different times, each adaptor defining a different plug type and a different electrical configuration from those of one another, output power according to both the corresponding plug type and the corresponding electrical configuration of the adaptor.

In still another approach, a system for a vehicle may include a traction battery and a voltage converter connected to the battery, and a voltage converter that selectively connects to one of a plurality of electrical adaptors, the converter configured to transfer, from the battery, voltage and current according to the connected adaptor to power an electrical load external to an electrical system of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
   a converter;
   first, second, third, and fourth outlets,
   wherein the third and fourth outlets are each in selective electrical communication with the converter,
   wherein the third outlet has an electrical parameter configuration that is different than the first and second outlets, and
   wherein the fourth outlet has another electrical parameter configuration that is different than the first, second, and third outlets;
   a switching arrangement electrically between the outlets and converter; and a controller programmed to, responsive to a first request, operate the switching arrangement to electrically connect a line and neutral to the first outlet and operate the converter to output single-phase power to the first outlet, and responsive to a second request,
   operate the switching arrangement to electrically connect a plurality of lines and not the neutral to the second outlet, and
   operate the converter to output three-phase power to the second outlet, wherein the switching arrangement includes a first contactor group configured to selectively electrically connect the first outlet to the converter, and
a second contactor group configured to selectively electrically connect the second outlet to the converter,
wherein the first contactor group includes a first contactor configured to selectively electrically connect the first outlet to the line,
a second contactor configured to selectively connect the first outlet to the neutral, and
a third contactor configured to selectively electrically connect the first outlet to a ground line, and
wherein the second contactor group includes a fourth contactor configured selectively electrically connect the second outlet to the line,
a fifth contactor configured to selectively electrically connect the second outlet to a second line,
a sixth contactor configured to selectively electrically connect the second outlet to a third line, and
a seventh contactor configured to selectively electrically connect the second outlet to the ground line.

2. The vehicle system of claim 1 wherein the line is configurable to selectively electrically connect the converter to the first outlet and the second outlet.

3. The vehicle system of claim 1 wherein the first outlet is a 120-volt, 60-hertz, single-phase outlet, and wherein the second outlet is a 208-volt, 60-hertz, three-phase outlet.

4. The vehicle system of claim 1 wherein the first outlet has a first voltage, wherein the second outlet has a second voltage different than the first voltage, wherein the third outlet has a third voltage different than the first and second voltages, and wherein the fourth outlet has a fourth voltage different than the first, second, and third voltages.

5. The vehicle system of claim 1 further comprising a second converter, wherein the controller is further programmed to, responsive to a third request, operate the switching arrangement to electrically connect a second line, and not the line, to the third outlet, and operate the converter and the second converter to output single-phase power in parallel to the third outlet, and responsive to a fourth request, operate the switching arrangement to electrically connect a third line, and not the line or the second line, to the fourth outlet, and operate the converter and the second converter to output single-phase power in parallel to the fourth outlet.

6. A vehicle system comprising:
first and second converters;
first, second, third, and fourth outlets,
wherein the third and fourth outlets are each in selective electrical communication with the first converter,
wherein the third outlet has an electrical parameter configuration that is different than the first and second outlets, and wherein the fourth outlet has another electrical parameter configuration that is different than the first, second, and third outlets;
a switching arrangement electrically between the outlets and first converter; and a controller programmed to,
responsive to a first request,
operate the switching arrangement to electrically connect a line and neutral to the first outlet and operate the first converter to output single-phase power to the first outlet, and
responsive to a second request,
operate the switching arrangement to electrically connect a plurality of lines and not the neutral to the second outlet, and
operate the first converter to output three-phase power to the second outlet,
responsive to a third request,
operate the switching arrangement to electrically connect a second line, and not the line, to the third outlet, and
operate the first converter and the second converter to output single-phase power in parallel to the third outlet, and
responsive to a fourth request,
operate the switching arrangement to electrically connect a third line, and not the line or the second line, to the fourth outlet, and
operate the first converter and the second converter to output single-phase power in parallel to the fourth outlet.

7. The vehicle system of claim 6, wherein the switching arrangement includes a first contactor group configured to selectively electrically connect the first outlet to the first converter, and a second contactor group configured to selectively electrically connect the second outlet to the first converter.

8. The vehicle system of claim 6, wherein the first contactor group includes a first contactor configured to selectively electrically connect the first outlet to the line, a second contactor configured to selectively connect the first outlet to the neutral, and a third contactor configured to selectively electrically connect the first outlet to a ground line.

9. The vehicle system of claim 6, wherein the second contactor group includes a fourth contactor configured selectively electrically connect the second outlet to the line,
a fifth contactor configured to selectively electrically connect the second outlet to a second line,
a sixth contactor configured to selectively electrically connect the second outlet to a third line, and
a seventh contactor configured to selectively electrically connect the second outlet to the ground line.

10. The vehicle system of claim 6, wherein the first outlet has a first voltage, wherein the second outlet has a second voltage different than the first voltage,
wherein the third outlet has a third voltage different than the first and second voltages, and
wherein the fourth outlet has a fourth voltage different than the first, second, and third voltages.

11. The vehicle system of claim 6, wherein the line is configurable to selectively electrically connect the first converter to the first outlet and the second outlet.

12. The vehicle system of claim 6, wherein the first outlet is a 120-volt, 60-hertz, single-phase outlet, and
wherein the second outlet is a 208-volt, 60-hertz, three-phase outlet.

* * * * *